United States Patent Office 3,839,382
Patented Oct. 1, 1974

3,839,382
PROCESS FOR THE PREPARATION OF
ORGANOCHLOROSTANNANES
Georges Bakassian, St.-Foy-les-Lyon, Michel Gay, Lyon, and Marcel Lefort, Caluire, France, assignors to Rhone-Poulenc S.A., Paris, France
No Drawing. Filed Aug. 10, 1973, Ser. No. 387,508
Claims priority, application France, Aug. 11, 1972, 7229099, 7229100
Int. Cl. C07j 7/22
U.S. Cl. 260—429.7                    7 Claims

ABSTRACT OF THE DISCLOSURE

Dichlorostannanes of formula $Z(Y)SnCl_2$ where Y is chlorine or a hydrocarbon radical and Z is an aryl or alkenyl radical are obtained by reacting in the presence of $AlCl_3$ a tin halide $YSnCl_3$ with an organosilicon compound

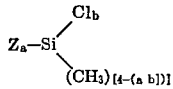

where $a$ is 1, 2, 3 or 4, $b$ is 0, 1, 2 or 3, $a+b$ is not greater than 4 and $b=0$ when Z is alkenyl.

The present invention relates to a process for the preparation of organochlorostannanes containing alkenyl and/or aromatic groups directly bonded to the tin atom. These organostannanes are produced in accordance with the process which employs a redistribution reaction between tin halides and organosilicon compounds.

Various processes for the production of halogenostannanes possessing alkenyl groups, for example, vinyl- and allyl-halogenostannanes, are known at the present time. It is thus possible to prepare diallyl-tin dibromide by direct synthesis starting from allyl bromide and finely divided tin [J. Org. Chem., 26, 2301 (1961)]. Direct synthesis is not, however, a general process for the production of alkenylhalogenostannanes, since it appears that it can be carried out only by using very active alkenyl halides. The most common method for the preparation of alkenylchlorostannanes such as vinyl- or allyl-chlorostannanes, involves a redistribution reaction of tetraalkenyl-stannanes, usually produced by the method employing a magnesium compound, with tetrahalogeno-tin compounds or trihalogenoorgano-tin compounds (U.S. Pat. 2,873,288).

Various processes for the production of stannanes possessing aromatic groups, for example phenylstannanes, are also known. The latter are prepared industrially by direct synthesis by heating aryl halides with finely divided particles of tin, generally in the presence of activators such as metal iodides. Such processes are described, for example, in French Patent Nos. 1,456,268 and 1,087,051. It is also known to prepare phenylchlorostannanes by a redistribution reaction starting from tetraphenyl-tin and tetrachloro-tin or trichloroorgano-tin [British Patent 1,070,942 and J. Org. Chem. 1119, 33 (1968)].

The present invention provides a process for the production of a chlorostannane having the general formula:

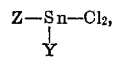

wherein Y is a chlorine atom or a saturated or unsaturated aliphatic, cycloaliphatic or aromatic hydrocarbon radical, and Z is either a group $Z_1$ having the general formula:

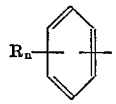

in which R represents a chlorine atom or an alkyl radical with 1 to 4 carbon atoms and wherein $n$ is 0, 1 or 2, or a group $Z_2$ having the general formula:

in which $R_1$, $R_2$ and $R_3$, which may be identical or different, each represent a hydrogen atom or a saturated or unsaturated aliphatic, cycloaliphatic or aromatic hydrocarbon radical, or two radicals $R_1$ and $R_3$, together with the two ethylenic carbons to which they are bonded, form an unsaturated ring having 5 or 6 carbon atoms in the ring, in which a tin halide of the general formula:

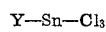

is reacted, in the presence of aluminium chloride with an organosilicon compound of the formula:

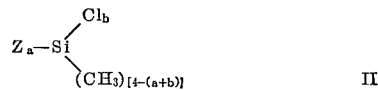

wherein Y and Z are as defined above, $a$ is 1, 2, 3 or 4, $b$ is 0, 1, 2, or 3, the sum $(a+b)$ is not greater than 4, $b$ being 0 when Z is $Z_2$.

Without wishing to prejudge the mechanism of the reaction, we believe at the moment that it can be represented by the following equation:

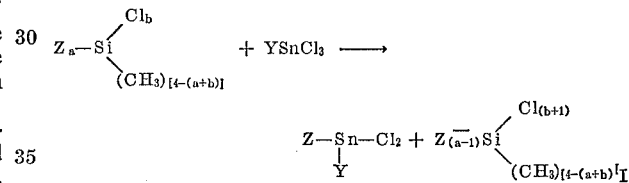

More particularly, when $Z=Z_1$, $n$ is preferably zero or equal to 1, and when $n$ is equal to 1, the symbol R represents a chlorine atom or a methyl radical. When $Z=Z_2$, $a$ is preferentially equal to 1 and $R_1$, $R_2$ and $R_3$ preferentially represent hydrogen atoms, straight or branched, saturated or unsaturated, aliphatic hydrocarbon radicals having at most 6 carbon atoms, cycloalkyl or cycloalkenyl radicals possessing 4 to 6 carbon atoms in the ring, or phenyl, alkylphenyl or phenylalkyl radicals in which the alkyl group contains 1 to 4 carbon atoms.

Y preferentially represents a chlorine atom, a straight or branched, saturated or unsaturated, aliphatic hydrocarbon radical having at most 6 carbon atoms such as methyl, ethyl, propyl, isopropyl, butyl, t-butyl, vinyl and allyl radicals, a cycloalkyl or cycloalkenyl radical possessing 4 to 6 carbon atoms in the ring, or a pheny, alkylphenyl or phenylalkyl radical in which the alkyl group contains 1 to 4 carbon atoms.

Amongst the organosilicon compounds which can be used in the process according to the invention, there may be mentioned by way of illustration, amongst the compounds in which Z is represented by $Z_2$, divinyldimethylsilane,
1-propenyl-trimethylsilane,
1-isopropenyl-trimethylsilane,
1-butenyl-trimethylsilane,
(2-methyl-but-1-enyl)-trimethylsilane,
(1-methyl-pent-1-enyl)-trimethylsilane,
(1-dimethyl-but-1-enyl)-trimethylsilane,
1,2- or 2,2-diphenyl-vinyltrimethylsilane and
(1-methyl-4-phenyl-but-1-enyl)-trimethylsilane.

Amongst the organosilicon compounds which can be used in the process according to the invention, there may me mentioned by way of illustration, amongst the compounds in which Z is represented by $Z_1$, phenylthichlorosilane, p-chlorophenyltrichlorosilane, diphenyldichlorosilane, phenylmethylchlorosilane, phenyltrimethylsilane, phenylmethyldichlorosilane, triphenylchlorosilane, tetraphenylsilane, phenylbenzyldichlorosilane, p-tolylmethyldichlorosilane, bis-p-tolyldichlorosilane, bis-p-tolylmethylchlorosilane and the like.

Amongst the chloro-tin compounds of the formula (II) which can be used in the process according to the invention, there may be mentioned by way of illustration, tetrachloro-tin, phenylthichloro-tin, vinyltrichloro-tin, butyltrichloro-tin, octyltrichloro-tin, cyclohexyltrichloro-tin or benzyltrichloro-tin.

Aluminium chloride, which is the catalyst for the redistribution reaction of the present process, can be used in proportions by weight ranging from 0.1 to 10%, and preferably from 0.5 to 5%, relative to the total weight of the compounds employed. The reaction can optionally be carried out in a solvent which is inert with respect to reagents and to the reaction products. Benzene, toluene, hexane or cyclohexane may be mentioned, by way of illustration, amongst the solvents which can be used.

The organosilicon compound (III) and the tin halide (II) can be reacted in any proportions whatsoever. In general, a slight excess of the organosilicon compound relative to the stoichiometric requirements of the reaction, as defined above, is added. The reagents, the catalyst and, where appropriate, the solvent, are heated in the liquid phase at a temperature which is generally between 10 and 250° C. and preferably between 20 and 200° C. The order in which the reagents are employed is not critical. In general, all of the reagents are heated at the desired temperature until the reaction is complete; it is also possible to introduce the silicon-containing compound gradually into the vessel which already contains tetrachloro-tin (or the organo-trichloro-tin compound) and aluminium chloride. It is also possible to remove the volatile products formed during the reaction, as they are produced. The reaction can be carried out at a pressure less than, equal to or greater than atmospheric pressure.

At the end of the period of heating, the constituents of the reaction mixture can be separated by any known method, for example, by fractional distillation. In order to prevent the aluminium chloride from being carried away in the distillates and to prevent subsequent side reactions from taking place, it is possible optionally to complex the catalyst in the final mixture. This operation can be carried out by adding a ketone such as acetone, for example, at a temperature of the order of 20 to 25° C. It is also possible to add an alkali metal halide, such as sodium chloride, to the final mixture and to heat the mixture for a short time.

The process according to the invention makes it possible to obtain numerous phenylchlorostannanes and alkenylchlorostannanes. Amongst the phenylchlorostannanes, there may be mentioned by way of illustration, phenyltrichloro-tin, p-chlorophenyltrichloro-tin, p-, m- or o-methylphenyltrichloro-tin, diphenyldichloro-tin, phenylmethyldichloro-tin, phenylbutyldichloro-tin and phenylvinyldichloro-tin.

Among the alkenylchlorostannanes, there may be mentioned by way of illustration, vinyltrichloro-tin, 1-propenyl-trichloro-tin, 1-butenyl-trichloro-tin, divinyldichloro-tin, vinylbutyldichloro-tin, vinylmethyldichloro-tin, vinylphenyldichloro-tin and the like.

Alkenylchlorostannanes, and in particular vinylchlorostannanes, are important intermediates in synthesis in organometallic chemistry. They make it possible to gain access to compounds which have diverse industrial applications, particularly in the field of fungicides and in the field of stabilisers for plastics. Organo-tin vinylmercaptides and vinyl maleates may be mentioned in this context.

Organochlorostannanes containing aromatic groups directly bonded to the tin atom, and in particular phenylchlorostannanes, make it possible to gain access to compounds which have diverse industrial applications amongst which the preparation of fungicides and stabilisers may be mentioned.

The examples which follow illustrate the invention.

Example 1

130 g. of stannic chloride and 7 g. of ground aluminium chloride are introduced into a flask and then 75 g. of trimethylphenylsilane are run in over the course of 1 hour at ambient temperature (20° C.), followed by 6.1 g. of acetone. On rectification of the mixture, 120 g. of phenyltrichlorostannane are obtained (Boiling point$_6$: 110–114° C.) (yield: 79.5%).

Example 2

100.7 g. of trichlorophenylstannane and 5.1 g. of aluminium chloride are introduced into a flask, and 50 g. of trimethylphenylsilane are run in over the course of 1 hour at 20° C. After adding 4.4 g. of acetone and distilling, diphenyldichlorostannane is obtained in a yield of 25%.

Example 3

127 g. of diphenyldichlorosilane, 130 g. of stannic chloride and 9.7 g. of aluminium chloride are introduced into a reactor flask and the mixture is heated at 100° C. for 2 hours. After cooling to ambient temperature, 7.6 g. of acetone are added and, on distillation, phenyltrichlorostannane is obtained in a yield of 66.1%.

Example 4

The reaction mixture consisting of:

|  | G. |
|---|---|
| Trichlorophenylstannane | 60.4 |
| Diphenyldichlorosilane | 50.6 |
| Aluminium chloride | 3.8 | is heated at 200° C. for 2 hours.

After cooling to ambient temperature, 3.3 g. of acetone are added and, after distillation, diphenyldichlorostannane is isolated in a yield of 34.4%.

Example 5

169.2 g. of butyltrichlorostannane, 60 g. of trimethylvinylsilane and 1 g. of ground aluminium chloride are introduced into a flask and the reagents are heated under reflux for 1 hour (temperature: 75–76° C.). After cooling to ambient temperature, 2 ml. of acetone are added and the mixture is stirred for 1 hour. On rectification, a first fraction of 63 g. (Boiling point$_{760}$: 55–56° C.) consisting of trimethylchlorosilane and a second fraction of 151.5 g. (Boiling point$_3$: 63–69° C.) consisting of vinylbutyldichlorostannane (melting point: 27° C.) are obtained.

Example 6

260.7 g. of stannic chloride, 100 g. of trimethylvinylsilane and 1.5 g. of ground aluminum chloride are introduced into a flask. Following a method of working identical to that of Example 1, 101 g. of trimethylchlorosilane and 191.5 g. of vinyltrichlorostannane (Boiling point$_{13}$: 55–60° C.) are isolated after rectification.

Example 7

The following amounts of reagents are introduced into a reactor flask:

|  | G. |
|---|---|
| Stannic chloride | 130.5 |
| Trimethylvinylsilane | 150 |
| Aluminium chloride | 2 |

Following the method of working of the preceding experiments, 144.5 g. of trimethylchlorosilane and 106 g. of divinyldichlorostannane (Boiling point$_{13}$: 76–80° C.) are isolated after rectification.

Example 8

120 g. of methyltrichlorostannane, 53 g. of trimethylvinylsilane and 1 g. of aluminium chloride are introduced into a flask. Following the method of working of the preceding experiments, 53 g. of trimethylchlorosilane and 99 g. of methylvinyltrichlorostannane (Boiling point$_{760}$: 189–190° C.) are isolated on distillation.

We claim:

1. A process for the production of a chlorostannane having the general formula:

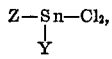

wherein Y is a chlorine atom or a saturated or unsaturated aliphatic, cycloaliphatic or aromatic hydrocarbon radical, and Z is either a group $Z_1$ having the general formula:

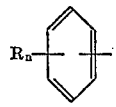

in which R represents a chlorine atom or an alkyl radical with 1 to 4 carbon atoms and wherein $n$ is 0, 1 or 2, or a group $Z_2$ having the general formula:

in which $R_1$, $R_2$ and $R_3$, which may be identical or different, each represent a hydrogen atom or a saturated or unsaturated aliphatic, cycloaliphatic or aromatic hydrocarbon radical, or two radicals $R_1$ and $R_3$, together with the two ethylenic carbons to which they are bonded, form an unsaturated ring having 5 or 6 carbon atoms in the ring, in which a tin halide of the general formula:

is reacted in the presence of aluminium chloride, with an organosilicon compound of the formula:

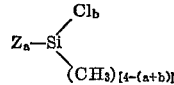

wherein Y and Z are as defined above, $a$ is 1, 2, 3 or 4, $b$ is 0, 1, 2 or 3, the sum $(a+b)$ is not greater than 4, $b$ being 0 when Z is $Z_2$.

2. A process according to claim 1, wherein Y represents a chlorine atom, a straight or branched, saturated or unsaturated, aliphatic hydrocarbon radical having at most 6 carbon atoms, a cycloalkyl or cycloalkenyl radical having 4 to 6 carbon atoms in the ring, or a phenyl, alkylphenyl or phenylalkyl radical in which the alkyl group contains 1 to 4 carbon atoms.

3. A process according to claim 1 wherein Z is $Z_1$, $n$ is 0 or 1 and R represents a chlorine atom or a methyl radical.

4. A process according to claim 1 wherein Z is $Z_2$, $a$ is 1 and $R_1$, $R_2$ and $R_3$ each is a hydrogen atom, straight or branched, saturated or unsaturated, aliphatic hydrocarbon radical having at most 6 carbon atoms, a cycloaliphatic or cyclolkenyl radical having 4 to 6 carbon atoms in the ring, or a phenyl, alkylphenyl or phenylalkyl radical in which the alkyl group contains 1 to 4 carbon atoms or $R_1$ and $R_3$, together with the two ethylenic carbons to which they are bonded, form an unsaturated ring with 5 or 6 carbon atoms in the ring.

5. A process according to claim 1 wherein the tin halide is stannic chloride, trichlorophenylstannane, butyltrichlorostannane or methyl trichlorostannane and the organosilicon compound is trimethylphenylsilane, diphenyldichlorosilane or trimethylvinylsilane.

6. A process according to claim 1 wherein the reaction is carried out in the liquid phase at 10–250° C.

7. A process according to claim 1 wherein, at the end of the reaction, acetone is added to the reaction mixture to complex the aluminium chloride.

References Cited

UNITED STATES PATENTS

| | | | |
|---|---|---|---|
| 2,873,287 | 2/1959 | Ramsden | 260—429.7 |
| 2,873,288 | 2/1959 | Rosenberg et al. | 260—429.7 |
| 3,027,393 | 3/1962 | Jenkner et al. | 260—429.7 |
| 3,287,386 | 11/1966 | Neumann | 260—429.7 |
| 3,752,835 | 8/1973 | Shapiro | 260—429.7 |
| 3,754,012 | 8/1973 | Bulten | 260—429.7 |

OTHER REFERENCES

Connor et al., Chemical Abstracts, 65(1966), column 8945d.

DANIEL E. WYMAN, Primary Examiner

A. P. DEMERS, Assistant Examiner

U.S. Cl. X.R.

260—448.2 E